March 16, 1965   M. H. GROVE   3,173,652
VALVE BODY WITH BOLTED RIB CONSTRUCTION
Original Filed Oct. 9, 1959
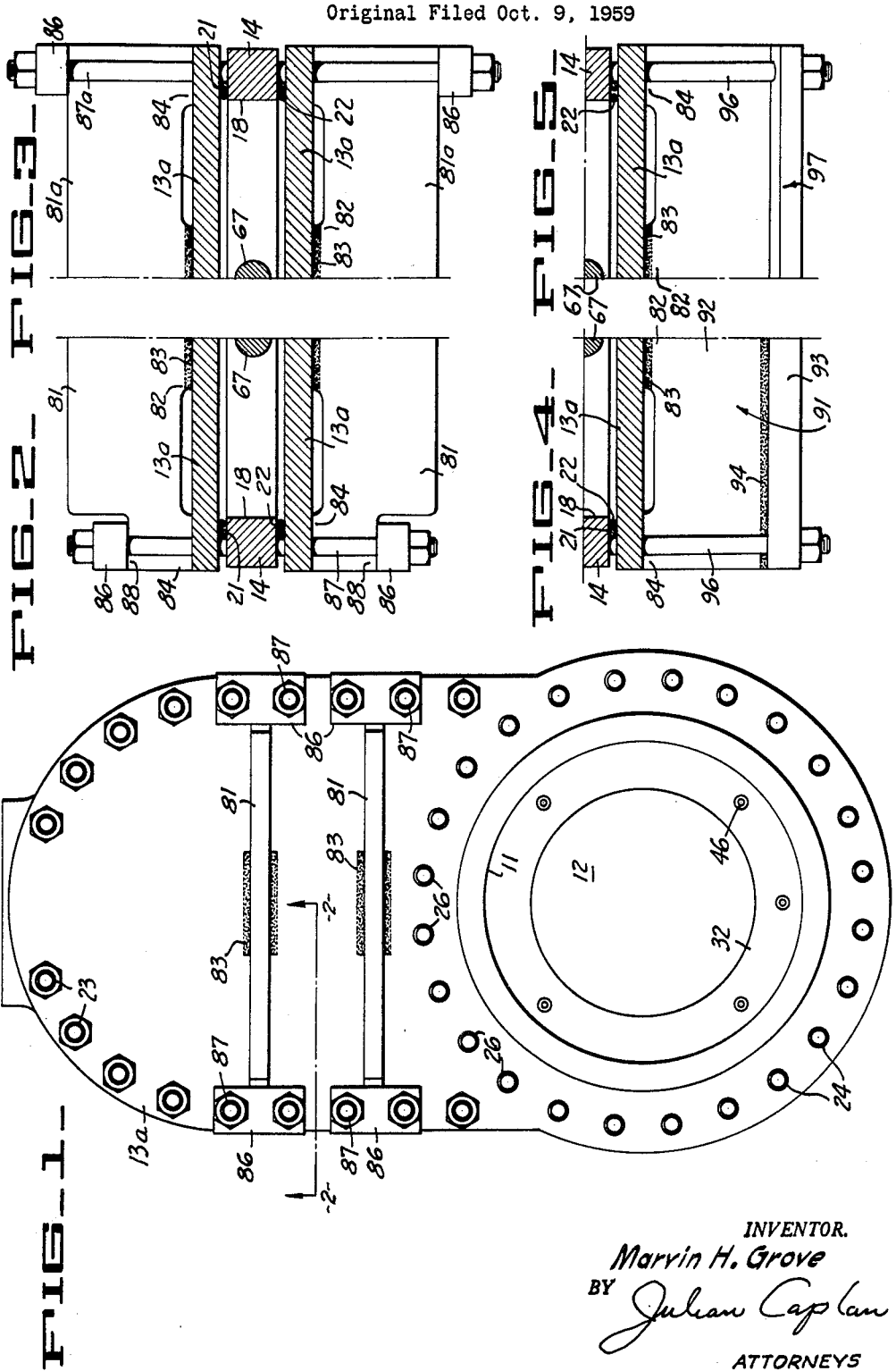
INVENTOR.
*Marvin H. Grove*
BY *Julian Caplan*
ATTORNEYS United States Patent Office 3,173,652
Patented Mar. 16, 1965

3,173,652
VALVE BODY WITH BOLTED RIB
CONSTRUCTION
Marvin H. Grove, Piedmont, Calif. (% M & J Engineering Co., 1422 Maury St., Houston 26, Tex.)
Original application Oct. 9, 1959, Ser. No. 845,382, now Patent No. 3,069,131, dated Dec. 18, 1962. Divided and this application June 4, 1962, Ser. No. 199,828
2 Claims. (Cl. 251—329)

This invention relates to a new and useful valve construction with plate sides and rib reinforcements. Reference is made to U.S. application, Serial No. 845,382, now Patent 3,069,131, of which this application is a division.

This invention relates generally to valves for controlling various fluids, including gases and liquids. More particularly it pertains to valves of the gate type wherein a valve gate is movable between open and closed positions relative to aligned flow passages in the body.

In place of the more conventional cast metal (e.g. cast iron or steel) the bodies of gate valves have been fabricated by welding together mill rolled structural forms, such as steel plate, channels and the like. Such fabricated bodies have proven economical and advantageous for gate valves of the larger sizes. Instead of fabricating by welding, it is possible to use plate-like body parts that are bolted together, with suitable sealing means between the parts to prevent leakage.

One problem encountered in the construction of gate valve bodies of the assembled type, is the provision of suitable reinforcement of the sides of the body, to maintain deflection of the side walls within acceptable limits for a given pressure rating. This matter is of particular importance where the valve body has sides made of flat plate, which have their margins bolted together upon an intermediate body part.

A further object of this invention is to provide a novel construction whereby the side plate-like parts of the fabricated body can be reinforced against internal pressure.

Additional objects and features of the invention will appear from the following description in which the preferred embodiment of the invention has been described in conjunction with the accompanying drawing.

In the drawings:

FIG. 1 is a side elevational view showing an embodiment of reinforcing means that is particularly adapted for high operating pressures.

FIG. 2 is a detail in section taken along the line 2—2 of FIG. 1.

FIGS. 3, 4 and 5 are views similar to FIG. 2, but illustrating other embodiments of the reinforcing means.

The particular valve constructed shown in the drawings consists generally of a body provided with flow passages 11 for connection with associated piping. The valve member 12 is in the form of a flat plate that is movable between open and closed positions with respect to the flow passages. The body is formed from the three plate-like parts 13a and 14, the parts 13a forming the side walls. Each of these parts can be made of mill rolled steel or like rigid plate materials, which may be cut to the configuration desired by suitable means such as an acetylene cutting torch. Body part 14 similarly can be cut out from a larger metal plate, both with respect to its outer contour, and also with respect to its inner contour.

Means is provided for forming seals between the body parts. Thus retainer wires 21, formed of relatively hard metal or metal alloy, are interposed between each side face of the intermediate body part 14 and the adjacent side faces of the body part 13a. Each wire retainer is made from a length of suitable wire having its ends butt welded or otherwise securely attached together. The resulting endless wire loop is sprung to conform generally to the shaping of the inner surface of the body part 14. A seal ring 22 of the resilient O-ring type is positioned immediately adjacent the inner periphery of the wire retainer 21. The body parts are securely clamped together by the bolts 23 together with stud bolts 24. Thus the retainer wires 21 are securely clamped between the body parts, and are securely held against displacement, thereby forming a fixed shoulder for taking the thrusts of fluid pressure acting upon the seal ring 22. Assuming that each wire retainer 21 is made of a material somewhat harder than the material from which the body parts are made, then the application of clamping forces may serve to cause a small amount of indentation of the wire into the adjacent surfaces of the body parts, thereby aiding retention against displacement.

As illustrated in FIG. 1, the exterior faces of the body parts can be machined to engage conventional pipe coupling flanges. In addition to the stud bolts 24, which are distributed to engage holes in the coupling flanges, threaded studs 26 are provided for the same purposes.

Sealing means between the gate and the body are illustrated in application Serial No. 845,382, now Patent 3,069,131.

FIGS. 1–5 illustrate reinforcement for the side body parts. In this instance the side body parts 13a have a configuration as illustrated in FIG. 1, and each body part is provided with the spaced parallel reinforcing ribs 81. As illustrated in FIG. 2, each rib has an intermediate pad portion 82, which can be attached to the adjacent intermediate portion of the corresponding body part 13a, as by a weld connection 83. The end portion 84 of each rib engage the corresponding margins of the body part 13a. Clamp bars 86 on the ends of the ribs 81 are engaged by the clamping bolts 87, which extend completely through the assembly. Thus these bolts not only serve to hold the ribs upon the body, but in addition they form a part of the means for clamping the parts of the body together. In FIG. 2, the ends of the ribs 81 are cut away to provide shoulders 88 for seating the clamp bars 86. In FIG. 3, such shoulders are not provided, and the clamp bars 86 directly engage the outer edges of the ribs. The ribs 81a and bolts 87a in this figure correspond generally to the ribs 81 and bolts 87 of FIG. 2.

In FIG. 4, instead of using a simple bar rib, I utilize a rib that is T-shaped in section. Such a rib 91 can be fabricated from the two bars 92 and 93, which are attached together by weld connection 94. The pads 82 and 84 are the same as in FIGS. 2 and 3. Bolts 96 clamp the end portions of these ribs to the body, and likewise serve to retain the parts of the body clamped together as previously described.

In FIG. 5, the bar 97 is likewise T-shaped in section and is made of mill rolled structural steel.

It will be evident that the reinforcing means described with reference to FIGS. 1–5, permits use of my valve for the higher operating pressure and for the larger pipe sizes. For a valve of a given size intended for a given pressure operating range, the strength and number of the reinforcing ribs is selected to maintain deflection under pressure within permissible limits. In some instances a single reinforcing rib may suffice, while in other instances two or more such ribs may be provided. For the construction illustrated in FIGS. 1–5, the number of ribs required can be readily applied to a given body construction, even under field conditions, and such ribs do not interfere with dismantling of the valve for repair.

What is claimed is:
1. In a valve body construction, a plurality of plate-like body parts, two of said parts forming side walls and one of said parts being interposed between the first two parts and having a configuration such as to form a body space, said two parts having aligned openings therein forming flow passages, a series of spaced bolts extending through the margins of said first two body parts and through said interposed body part to clamp the three body parts together, at least one reinforcing rib extending across the outerface of each of said first two body parts, the ends of said ribs terminating in regions adjacent said series of bolts, certain of said bolts adjacent the ends of said rib being of extended length, and means attaching said bolts of extended length to said ends of the ribs for clamping the ribs against the body, at least an intermediate portion of each rib serving to apply thrust to the adjacent intermediate portion of the corresponding side wall.

2. In a valve construction, a body comprising two spaced, parallel, plate-like walls having openings therein forming flow passages and an intermediate body part interposed between said two side walls and having a configuration such as to form with said side walls on enclosed body space first means for clamping the side walls and intermediate body part, said first means passing through said side walls, and second means for reinforcing said two side walls against outward deflection and bearing against said side walls, said second means comprising at least one rib extending across the exterior face of the corresponding side wall, and third means for releasably clamping the ends of the said rib to the margins of the corresponding side wall, said first means engaging and securing said third means.

References Cited in the file of this patent

UNITED STATES PATENTS

| | | |
|---|---|---|
| 12,007 | Tracy | Nov. 28, 1854 |
| 2,683,581 | Rovang | July 13, 1954 |
| 2,904,306 | Bryant | Sept. 15, 1959 |
| 3,013,770 | Anderson | Dec. 19, 1961 |
| 3,096,072 | Gulick | July 2, 1963 |

FOREIGN PATENTS

| | | |
|---|---|---|
| 508,384 | Belgium | Jan. 31, 1952 |
| 984,464 | France | Feb. 28, 1951 |